US007084588B2

(12) United States Patent
Hampo et al.

(10) Patent No.: US 7,084,588 B2
(45) Date of Patent: Aug. 1, 2006

(54) METHOD, APPARATUS AND ARTICLE FOR MOTOR CONTROL VOLTAGE DROPOUT DETECTION

(75) Inventors: Richard J. Hampo, Plymouth, MI (US); Venkatapathi R. Nallapa, West Bloomfield, MI (US); Christophe Soudier, Ann Arbor, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 10/903,918

(22) Filed: Jul. 30, 2004

(65) Prior Publication Data

US 2006/0022625 A1 Feb. 2, 2006

(51) Int. Cl.
*H02P 1/04* (2006.01)

(52) U.S. Cl. ............... 318/139; 318/484; 388/903; 388/909

(58) Field of Classification Search ................ 318/139, 318/430–434, 445, 484; 388/903, 909, 921
See application file for complete search history.

(56) References Cited

U.S. PATENT DOCUMENTS 3,716,756 A * 2/1973 Runge et al. ................. 361/22
4,354,214 A * 10/1982 Walton .......................... 361/23
4,617,472 A * 10/1986 Slavik .......................... 307/9.1
4,990,057 A * 2/1991 Rollins .......................... 417/12
5,524,448 A * 6/1996 Schwanebeck et al. ....... 62/231
5,601,178 A * 2/1997 Zaharia et al. .............. 198/323
5,831,804 A * 11/1998 Vilou .......................... 361/28
6,592,332 B1 * 7/2003 Stoker .......................... 417/12

OTHER PUBLICATIONS

Intel Corporation, "EEPROM Replacement with Flash Memory" *Application Note AP-685*, pp. 1-20, Dec. 1998.
Hazen, P., "Using Intel's Boot Block Flash Memory Parameter Blocks to Replace Eeprom," *Application Note AP-604*, pp. 1-6, Nov. 1995.
Advanced Micro Devices, "Am29F200B Data Sheet," Publication# 21526, pp. 1-39, Nov. 12, 1999.
STMicroelectronics, "Flash+, Exit the Emulation Compromise," ST Challenge, 4th Edition, 1997, retrieved Oct. 1, 2003, from http://us.st.com/stonline/press/magazine/challeng/4thedit/chal5.htm, 3 pages.

* cited by examiner

*Primary Examiner*—Bentsu Ro
(74) *Attorney, Agent, or Firm*—Seed IP Law Group PLLC (57) ABSTRACT

A control subsystem for an electric motor determines whether power was interrupted, and delays torque production if power was interrupted. The control subsystem may employ two separate non-volatile memory locations, or alternatively a single non-volatile memory location.

29 Claims, 6 Drawing Sheets

METHOD, APPARATUS AND ARTICLE FOR MOTOR CONTROL VOLTAGE DROPOUT DETECTION

BACKGROUND OF THE INVENTION

1. Field of the Invention

This disclosure generally relates to electric motors, and particularly to the control of electric motors in electric motor driven systems, for example, electric vehicles.

2. Description of the Related Art

A large variety of applications employ electric motors. For example, electric vehicles such as electric vehicles with battery, super- or ultra-capacitors, fuel cell and/or hybrid power sources employ electric motors in the power train to drive the traction wheels of the vehicle. Such electric motor driven vehicles may also employ electric motors to drive auxiliary devices, such as fans, compressors, blowers, moving seats and/or windows. Many other applications exist for electric motors that are not transportation vehicle related.

Electric motors may be driven using alternating current (AC) or direct current (DC) electric power. In the case of a traction motor for an electric motor driven vehicle, the electric motor is typically driven using AC power. The AC power may be supplied from a DC power source such as a battery, super- or ultra-capacitor, and/or fuel cell system. Such systems employ an inverter to transform the DC power from the DC power source to AC power for driving the electric motor. Typically, the AC power is supplied as three phase AC power at a relatively high voltage (e.g., 24VAC–400VAC).

Most motor driven applications employ a control subsystem for controlling operation of the electric motor. The control subsystem may include a microprocessor and associated memory which typically require DC power at a relatively low voltage (e.g., 2.5V–5V). Consequently, many electric motor driven systems will employ a low voltage power supply (LVPS) to transform the high voltage DC power from the DC power source to a low voltage suitable for use with the control subsystem.

There are a large variety of control subsystems and control regimes suitable for the different electric motor driven applications. Even in the relatively limited field of electric motor driven vehicles, a large number of different control subsystems and control regimes have been proposed. In almost all instances of electric motor driven systems, it is possible that power to the control subsystem may be interrupted during normal operation. In electric motor driven vehicle applications, the power train is required to resume normal torque production after low voltage dropout interruptions lasting under several seconds, for example, during periods of high torque demand. Conventional approaches may produce motor control loop stability problems, resulting in current demand surges while attempting to command full torque from an electric motor with insufficient flux. An improved motor control subsystem and control regime to address this problem is desirable.

BRIEF SUMMARY OF THE INVENTION

In one aspect, a method of operating an electric motor driven system comprises determining if an interruption of power to the control subsystem controlling the electric motor has occurred during at least one ON/OFF cycle of the electric motor driven system; and delaying torque production of the electric motor if it is determined that an interruption of power to the electric motor has occurred during the at least one ON/OFF cycle of the electric motor. The method may further comprise storing in a first non-volatile memory location a value indicative of a number of times the control subsystem has executed a shut down procedure; and storing in a second non-volatile memory location a value indicative of a number of times that the control subsystem has started.

In another aspect, a method of operating an electric motor of a vehicle comprises in response to a start up of a controller, comparing a value stored in a first non-volatile memory location to a value stored in a second non-volatile memory location, the value stored in the first non-volatile memory location indicative of a number of times that the controller has executed a shut down procedure and the value in the second non-volatile memory location indicative of a number of times that the controller has started up; and delaying torque production of the electric motor if the value stored in the first non-volatile memory location is equal to the value stored in the second non-volatile memory location.

In a further aspect, a control subsystem for controlling operation of an electric motor of an electric motor driven system comprises means for determining if an interruption of power to the control subsystem controlling the electric motor has occurred during at least one ON/OFF cycle of the electric motor driven system; and means for delaying torque production of the electric motor if it is determined that an interruption of power to the electric motor has occurred during the at least one ON/OFF cycle of the electric motor. The control subsystem may further comprise a first non-volatile memory location to a value indicative of a number of times the control subsystem has executed a shut down procedure; and a second non-volatile memory location to store a value indicative of a number of times that the control subsystem has started, wherein the means for determining if an interruption of power to the control subsystem controlling the electric motor has occurred during at least one ON/OFF cycle of the electric motor driven system comprises means for comparing the value stored in the first non-volatile memory location to the value stored in the second non-volatile memory location.

In still a further aspect, a control subsystem for controlling an operation of an electric motor of an electric motor driven system comprises a first non-volatile memory location to store a value indicative of a number of times a controller has executed a shut down procedure; a second non-volatile memory location to store a value indicative of a number of times the controller has started up in an ON/OFF cycle; and a processor configured to increment the value indicative of the number of times the controller has executed the shut down procedure at each execution of the shut down procedure, and further configured to delay torque production if a defined relationship between the value stored in the first non-volatile memory location and the value stored in the second non-volatile memory location is satisfied.

In still a further aspect, a method of operating an electric motor driven system comprises checking a value stored in a first non-volatile memory location during a start up procedure, the value representing whether a shut down procedure has previously been completed; delaying torque production of the electric motor if the value stored in the first non-volatile memory location is equal to a first value; storing a second value to a first non-volatile memory location as part of a start up procedure; after storing the second value to the first non-volatile memory location as part of the start up procedure, enabling the electric motor; and if a shut down procedure is completed, storing the first value in the first non-volatile memory location at the end of the shut down procedure.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the present methods and systems. However, one skilled in the relevant art will recognize that the present methods and systems may be practiced without one or more of these specific details, or with other methods, components, materials, etc. In other instances, well known structures associated with electric motors, power subsystems, control subsystems, microprocessors, memories, and sensors have not been shown or described in detail to avoid unnecessarily obscuring descriptions of the embodiments of the present methods and systems.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the present methods and systems. Thus, the appearances of the phrases "in one embodiment" or "in an embodiment" in various places throughout this specification are not necessarily all referring to the same embodiment. Further more, the particular features, structures, characteristics or operations may be combined in any suitable manner in one or more embodiments.

The headings provided herein are for convenience only and do not interpret the scope or meaning of the claimed invention.

Figure 1:
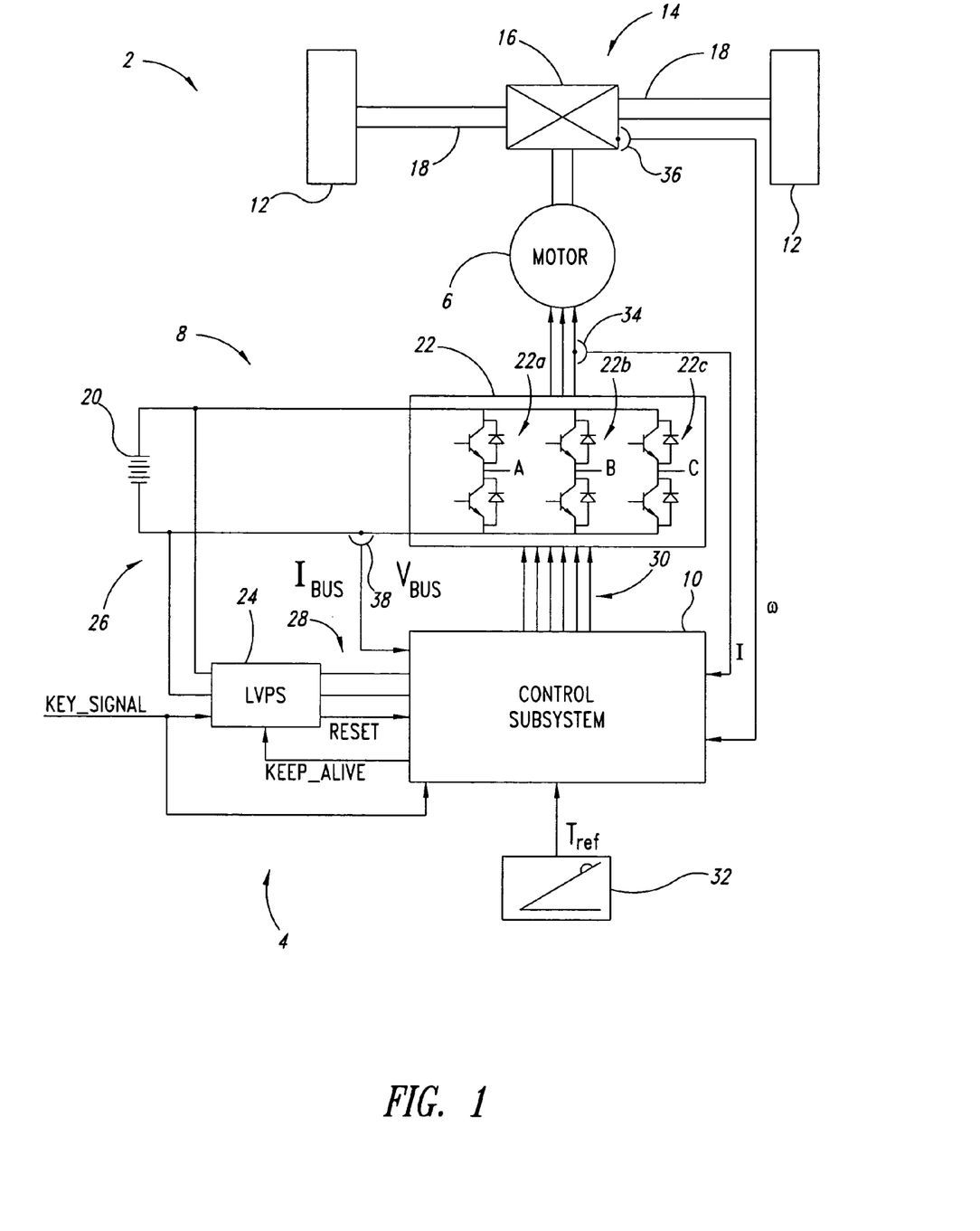
FIG. 1 is a functional block diagram of an electric motor driven system in the form of an electric motor driven vehicle comprising a motor, a power subsystem and a control subsystem according to one illustrated embodiment.

FIG. 1 shows an electric motor driven vehicle 2 comprising an electric motor drive system 4. The electric motor drive system 4 comprises an electric motor 6, a power subsystem 8 and a control subsystem 10.

The electric motor 6 provides drive torque to drive a set of wheels 12 of the electric motor driven vehicle 2. A drive train 14 comprising a transaxle 16 and drive shaft 18 physically couples the electric motor 6 and the wheels 12. The transaxle 16 includes gearing selected to provide appropriate torque and rotational speed ratios between the electric motor 6 and the wheels 12. Some embodiments commonly referred to as "hybrids" may include an internal combustion engine (not shown). The internal combustion engine may be coupled to the drive train 14 in "parallel" with the electric motor drive system 4. Alternatively, or additionally, the internal combustion engine may be coupled to drive a generator to supply power to the power subsystem 8. The internal combustion engine in such embodiments are typically considered to be in "series" with the electric drive system 4.

A vehicle with an internal combustion engine typically has a multi-speed transmission to provide appropriate torque at all speeds. The electric motor driven vehicle 2 can use a single speed transmission if the internal combustion engine is omitted, or if the internal combustion engine is provided in series with the electric drive system 4. This is due to the mechanical simplicity of an electric motor 6 and the motor's resultant ability to deliver required driving torque over a much wider speed range than an internal combustion engine. Thus, transaxle 16 may be a single speed transaxle. Such a transaxle has considerable advantages of simplicity, reliability and relatively low cost.

The power subsystem 8 comprises a power source 20 that provides electric power for the electric motor 6. The power source 20 may take any of a variety of forms. In transportation related applications, the power source 20 typically takes the form of one or more DC power sources capable of storing electric power, for example, a set of battery cells and/or super- or ultra-capacitors, and/or one or more DC power sources capable of producing electrical power, for example, a fuel cell stack. The electric motor driven vehicle 2 may or may not further comprise an internal combustion engine (not shown) physically coupled to the drive train, or coupled to drive a generator (not shown) to supply electrical power to the power source 20 and/or motor 6. Thus, as used herein and in the claims, an electric motor driven system includes any device or system that is driven in whole or in part by an electric motor, with or without additional motors or engines.

The power subsystem 8 also comprises one or more circuits for conditioning the electrical power, generically known as converters which may comprise one or more rectifiers, inverters and/or step-up or step-down converters.

Where the electric motor 6 takes the form of an AC electric motor, the power subsystem 8 comprises an inverter 22 to transform DC power from the power source 20 to AC power to drive the electric motor 6. Typically, the inverter 22 will take the form of a switch mode inverter. The inverter 22 may comprise a number of switching legs. For example, where the electric motor 6 is driven with three phase AC power, the inverter 22 may comprise three pairs of switching legs 22a–22c, each leg operable to produce a respect phase (A, B, C) of the AC power. Each switching leg 22a–22c may comprise one or more upper switches and one or more lower switches, with anti-paralleled diodes. While FIG. 1 illustrates the upper and lower switches of each leg 22a–22c as each comprising a respective switch and anti-parallel diode, each may actually comprise multiple switches and anti-parallel diodes electrically coupled in parallel. The upper and lower switches may, for example, take the form of insulated gate bipolar transistors (IGBTs) or metal oxide semiconductor field effect transistors (MOSFETs).

In some embodiments, the inverter 22 may take the form of a bi-directional converter. For example, the inverter 22 may also function as a rectifier for converting three phase power produced by the electric motor 6 operating as a generator in a regenerative braking mode to DC power to be stored in the power source 20, as is commonly understood by those of skill in the art. In some embodiments, the inverter 22 may function as a rectifier for converting AC power produced by a generator driven by an internal combustion engine of a hybrid, as is commonly understood by those of skill in the art.

The power subsystem 8 may further comprise a low voltage power supply (LVPS) 24 to transform power received from the power source 20 via a high power bus 26 into a form suitable for use with the control subsystem 10. For example, the low voltage power supply 24 may step down the voltage of DC power supplied from the power source 20, and/or may otherwise condition the power, supplying the low voltage power to the control subsystem 10 via a low voltage power bus 28. For example, the low voltage power supply 24 may convert unregulated 12V battery power to regulated 5V power. Low voltage power supplies are commercially available from a large variety of commercial sources. While not illustrated, the power subsystem 8 may include one or more low power storage devices in addition to the power source 20. These low power storage devices may, for example, comprise one or more battery cells and/or super- or ultra-capacitors coupled to supply a relatively intermediate level of power (e.g., 12V) to run various accessory items such as motors, seats, entertainment systems, etc. The low power storage devices may be coupled to supply power to the control subsystem 10 via the low voltage power supply 24.

The control subsystem 10 may comprise a microprocessor-based device and/or a hardwired device, for example, an application specific integrated circuit (ASIC), having appropriate inputs, outputs, throughput, and/or memory and the like to perform the functions ascribed to it herein. The control subsystem 10 provides gating control signals 30 to control the switches of the inverter 22. The control subsystem 10 also executes control logic for converting a torque demand signal $T_{ref}$ generated by a position of a throttle 32 such as a pedal sensor, into a current command for driving the electric motor 6 based on various operating characteristics of the electric motor drive system 4. For example, current sensors 34 and rotational encoders 36 provide actual motor current signal I and drive train rotational speed signal ω to the control subsystem 10. Voltage and/or current sensors 38 may provide DC bus voltage $V_{BUS}$ and/or bus current signals $I_{BUS}$ to the control subsystem 10. The control subsystem 10 may also receive a Start/Stop signal KEY_SIGNAL that indicates whether the electric motor drive system 4 is in an ON organ OFF condition or state. For example, the Start/Stop signal KEY_SIGNAL may indicate whether a key has been turned into an ON or Start position or turned to an OFF or Stop position to start and stop operation of the electric motor drive system 4, respectively. Thus, the Start/Stop signal KEY-SIGNAL defines an ON/OFF cycle for the electric motor drive system 4, which may be a determined or user selected starting and stopping of system operation. The control subsystem 10 may provide a KEEP_ALIVE signal to the low voltage power supply 24. The control subsystem 10 may receive a reset signal RESET from the low voltage power supply 24.

Figure 2:
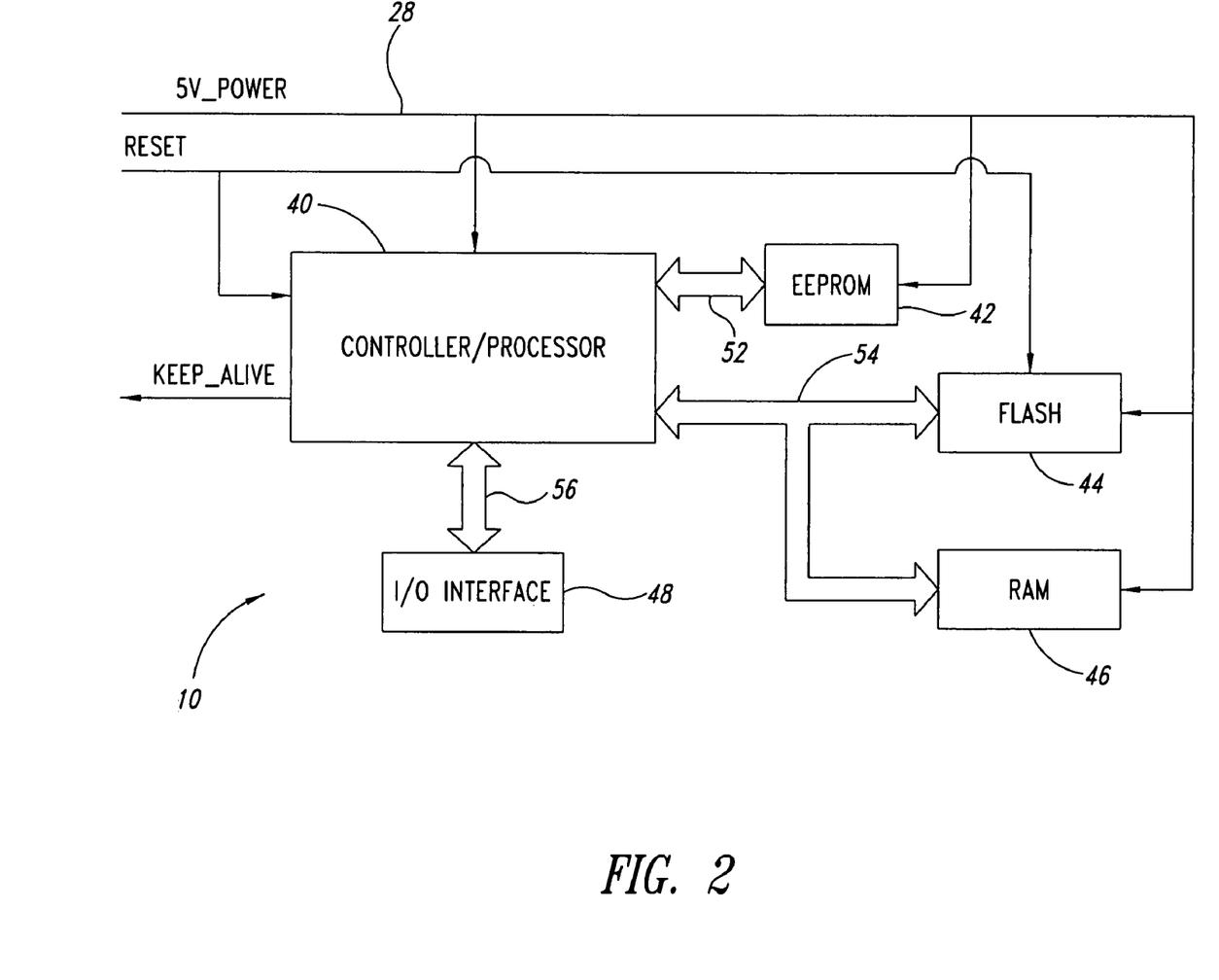
FIG. 2 is a functional block diagram of a control subsystem for controlling the electric motor and inverter of FIG. 1, according to one illustrated embodiment.

FIG. 2 shows the control subsystem 10 according to one illustrated embodiment. The control subsystem 10 comprises a microcontroller or microprocessor, collectively controller 40, and memory such as an electronically erasable programmable read-only memory (EEPROM) 42, flash memory 44 and random access memory (RAM) 46. Flash memory 44 is typically less expensive the comparable sizes of EEPROM 42. However, it typically takes longer to store data to flash memory 44, since each cell of the flash memory 44 must be erased prior to being reprogrammed, and flash memory 44 can only be erased as a sector or block at a time.

The control subsystem 10 may also include an input/output (I/O) interface 48, which may or may not include suitable buffers for buffering input and output Suitable low voltage power (e.g., 2.5 volt, 5 volt) is supplied to the controller 40, EEPROM 42, flash memory 44 and RAM 46 via the low voltage power bus 28. Data and instructions are passed between the controller 40 and EEPROM 42 Via a first internal communications bus 52. Data and instructions are passed between the controller 40 and the flash memory 44 and RAM 46 via a second internal communications bus 54. Data and instructions are passed between the controller 40 and the I/O interface 48 via a third internal communications bus 56. While illustrated as separate internal communications buses 52, 54, 56, some embodiments may combine one or more internal communications buses 52, 54, 56, or may use additional or different internal communications buses.

Figure 3:
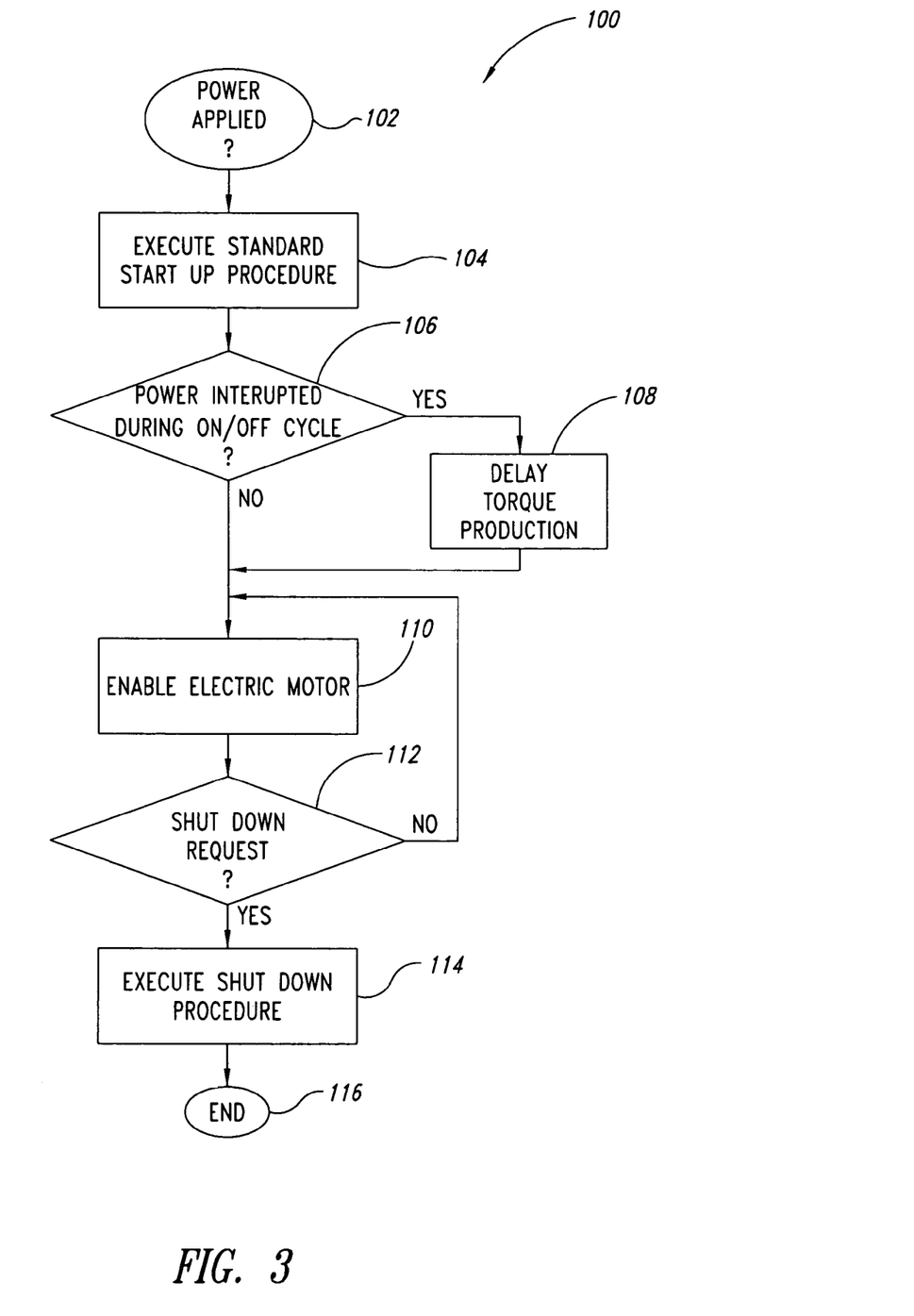
FIG. 3 is a high level flow diagram of a method of operating an electric motor driven system where the control subsystem employs a pair of non-volatile memory locations, according to one illustrated embodiment.

FIG. 3 shows a method 100 of operating the electric motor drive system 4 according to one illustrated embodiment. The method 100 starts at 102 when power is applied to the control subsystem 10. At 104, the controller 40 of the control subsystem 10 executes a standard start up procedure. The standard start up procedure may be any of a number of existing start up procedures which determine whether the control subsystem 10 and/or various other subsystems are operational.

As a modification to the standard start up procedure, the controller 40 determines whether power has been interrupted during an ON/OFF cycle at 106.

If the controller 40 determines that power has been interrupted during an ON/OFF cycle, the controller 40 delays torque production at 108. The controller 40 may delay torque production of the electric motor 6 by delaying activation of one or more of the switches on the inverter 22 by way of the control signals 30. After delaying torque production, the controller 40 enables the electric motor at 110. The controller 40 may enable the electric motor 6 by activating of one or more of the switches on the inverter 22 by way of the control signals 30.

If the controller 40 determines that power has not been interrupted during the ON/OFF cycle, the controller 4 immediately passes control to 110 to enable the electric motor 6 without delaying torque production.

At 112, the controller 40 determines whether a shut down request has been received. If the controller 40 determines that a shut down request has not been received, the controller continues to enable the electric motor, returning to 110. If the controller 40 determines that a shut down request has been received, the controller 40 executes a shut down procedure at 114. The method 100 terminates at 116, at the end of the shut down procedure 114.

Figure 4A:
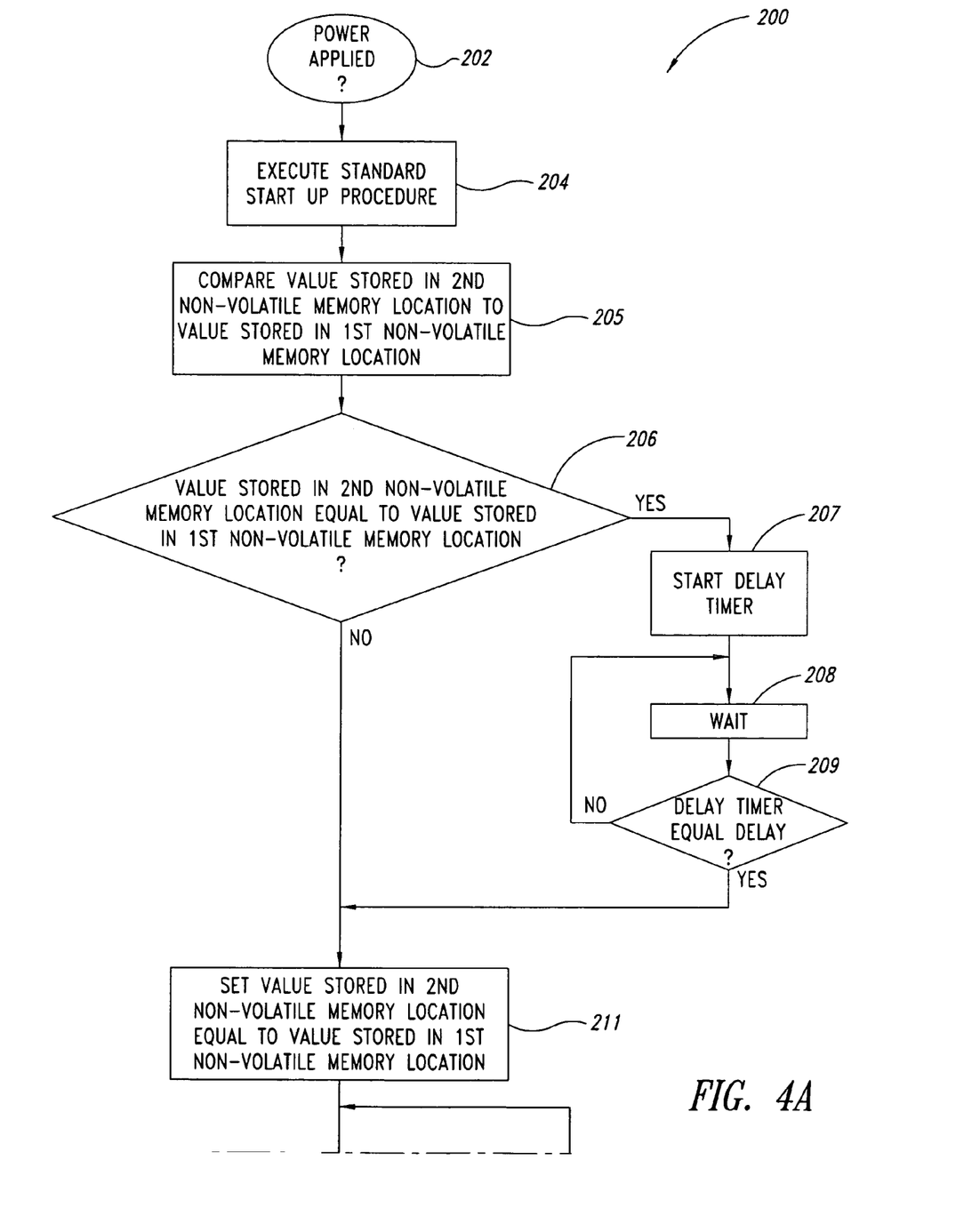
FIGS. 4A–4B is a low level flow diagram of a method of operating an electric motor driven system in accordance with the high level flow diagram of FIG. 3, according to one illustrated embodiment.
Figure 4B:
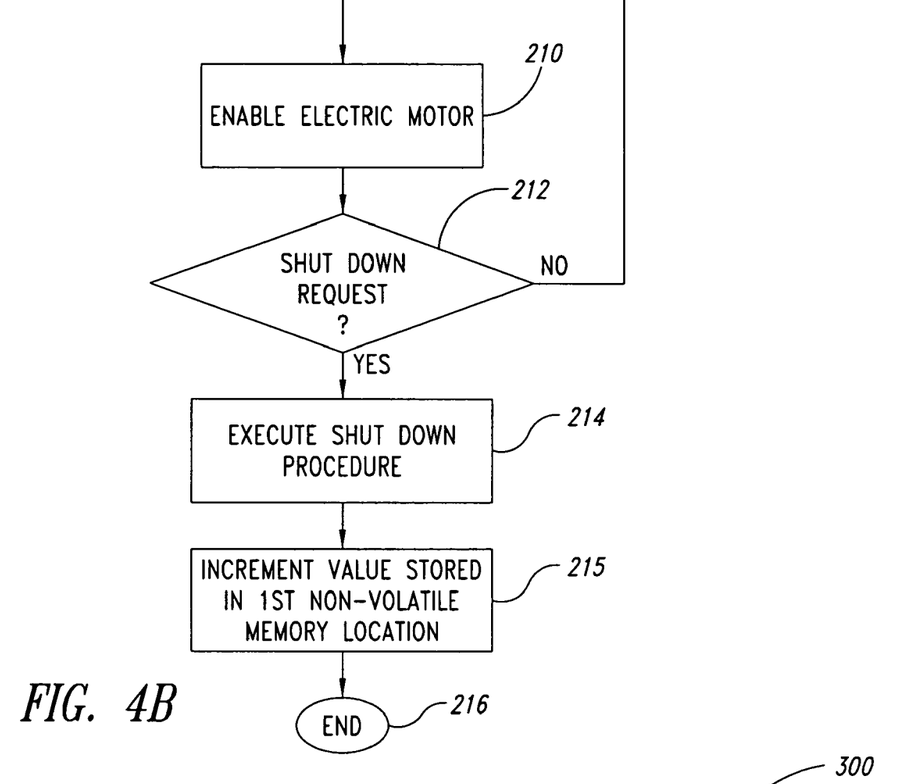

FIGS. 4A–4B shows a method 200 of operating the electric motor drive system 4 according to another illustrated embodiment. The method 200 illustrates a particular embodiment of the method 100 (FIG. 3). The method 200 starts at 202 when power is applied to the control subsystem 10. At 204, the controller 40 of the control subsystem 10 executes a standard start up procedure.

As a modification to the standard start up procedure, the controller 40 of the control subsystem 10 compares a value stored in a second non-volatile memory location to a value stored in a first non-volatile memory location at 205. The first non-volatile memory location may be a location in the flash memory 44, while the second non-volatile memory location may be a location in the EEPROM 42. This takes the relative speed of the EEPROM 42 with respect to the flash memory 44, while balancing the relative cost of EEPROM 42 versus flash memory 44. For example, the flash memory 44 may be used to store values during a controlled shut down since the shut down procedure can accommodate the relative slowness of storing data to flash memory 44, while the EEPROM 42 may be used to store data during the start up where responsiveness is more important. Alternatively, in some embodiments the first and second memory locations may be respective locations in the same flash memory 44 or in the same EEPROM 42. The control subsystem 10 may employ additional and/or different memory devices.

At 206 the controller 40 determines whether the value stored in the second non-volatile memory location is equal to the value stored in the first non-volatile memory location.

If the controller 40 determines that the value stored in the second non-volatile memory location is equal to the value stored in the first non-volatile memory location, the control subsystem 10 determines that power interruption has occurred and delays torque production. For example, the controller 40 may start a delay timer at 207, executing a wait loop at 208 until the controller 40 determines that the delay timer is equal to a defined delay time at 209. If however the controller 40 determines that the value stored in the second non-volatile memory location is not equal to the value stored in the first non-volatile memory location, then a power interruption has not occurred and the controller 40 passes control directly to 211.

At 211, the controller 40 sets the value stored in the second non-volatile memory location equal to the value stored in the first non-volatile memory location. At 210, the controller 40 enables the electric motor 6, for example, providing appropriate control signals 30 to the inverter 22.

At 212, the controller 40 determines whether a shut down request has been received. If the controller 40 determines that a shut down request has not been received, the controller 40 continues to enable the electric motor 6 returning to 210. If the controller 40 determines that a shut down request has been received, the controller 40 executes a standard shut down procedure at 214. As a modification to the standard shut down procedure, the controller 40 increments the value stored in the first non-volatile memory location at 215. The method 200 terminates at 216.

Figure 5:
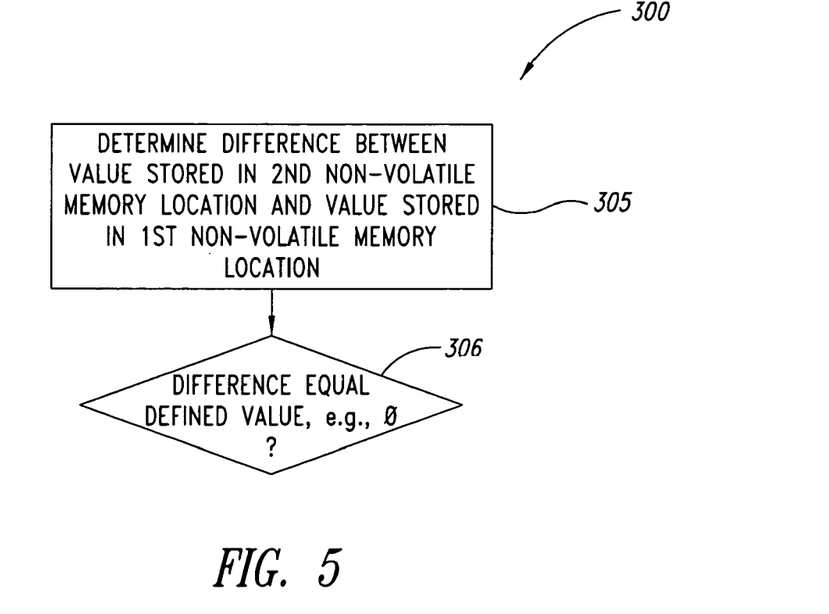
FIG. 5 is a portion of a low level flow diagram suitable to replace a portion of the method of FIGS. 4A–4B, according to another illustrated embodiment.

FIG. 5 shows a portion of a method 300 which may be substituted for a portion of the method 200. In particular, the controller 40 determines the difference between a value stored in the second non-volatile memory location and a value stored in the first non-volatile memory location at 305. At 306, the controller 40 determines whether the difference is equal to a defined value. For example, the controller 40 may determine whether the difference between the value stored in the second non-volatile memory location and the value stored in the first non-volatile memory location is equal to zero. These acts may be substituted for the acts 205 and 206 of method 200, respectively.

Figure 6:
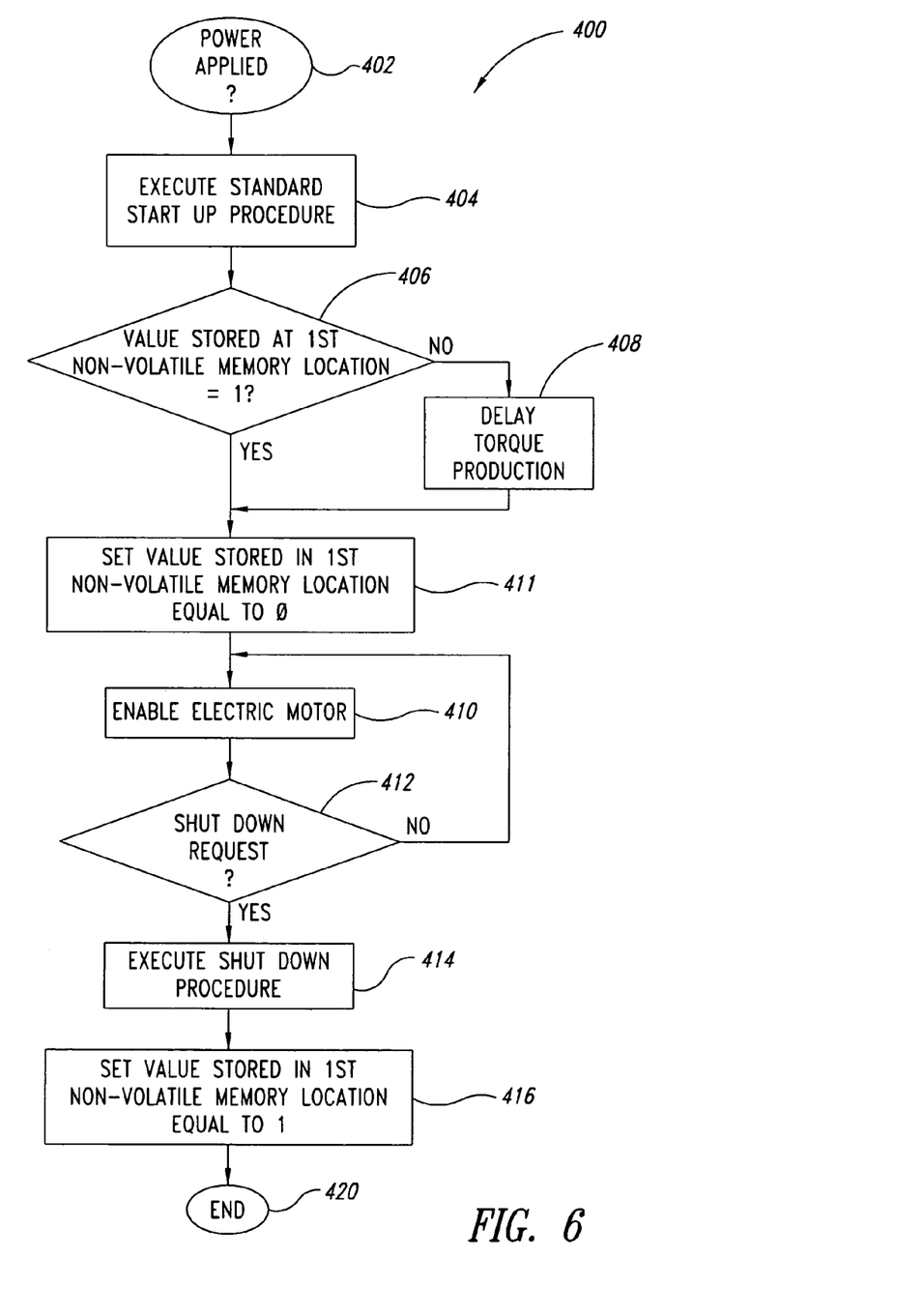
FIG. 6 is a low level flow diagram of a method of operating an electric motor driven system where the control subsystem employs a single non-volatile memory location, according to another illustrated embodiment.

FIG. 6 shows a method 400 of operating the motor drive system 4 employing a single non-volatile memory location according to another illustrated embodiment. The method 400 starts at 402 when power is applied to the control subsystem 10. At 404, the controller 40 of the control subsystem 10 executes a standard start up procedure.

As a modification to the standard start up procedure, the controller 40 of the control subsystem 10 determines whether a value stored in a first non-volatile memory location is equal to a defined first value at 406. The defined first value may, for example, be a logical TRUE, ON or 1. The first non-volatile memory location may be a location in the EEPROM 42. Alternatively, the first non-volatile memory location may be a location in the flash memory 44.

If the controller 40 determines that the value stored in a first non-volatile memory location is not equal to a defined first value, the controller 40 delays torque production at 408, for example, by controlling the switches of the inverter 22 via the control signals 30. After delaying torque production for the desired period, the controller 40 then passes control to 411. If the controller 40 determines that the value stored in a first non-volatile memory location is equal to a defined first value, the controller 40 passes control directly to 411.

At 411, before enabling the electric motor 6 the controller 40 sets the value stored in the first non-volatile memory location equal to a first defined value, for example, zero (0). The first defined value indicates that the controller 40 has not yet executed the shut down procedure.

At 410, the controller 40 enables the electric motor 6, for example, providing appropriate control signals 30 to the inverter 22.

At 412, the controller 40 determines whether a shut down request has been received. If the controller 40 determines that a shut down request has not been received, the controller 40 continues to enable the electric motor 6 returning to 410. If the controller 40 determines that a shut down request has been received, the controller 40 executes a standard shut down procedure at 414. As a modification to the standard shut down procedure, at 415 the controller 40 sets the value stored in the first non-volatile memory location to a second defined value, for example one (1). The second defined value indicates that the controller 40 has completed the shut down procedure. The method 400 terminates at 420.

One example of operation is discussed below. Other examples of operation will be apparent.

In operation there may be three cases of interest. In the first case, where a control subsystem 10 is new, the values of both non-volatile memory locations may be the same (e.g., 0000). A flag brownout_error may consequently be set, resulting in a delay in torque production. This should not present an problem since the electric motor drive system 4 is being tested, and will perform as desired in further operation.

On the next subsequent power up, the value in the first non-volatile memory location is 0001 and the value in the second non-volatile memory location is 0000. The flag brownout_error will be cleared since the values are different, and no delay in torque production will occur. The value of the second non-volatile memory is set equal to the value of the first non-volatile memory location and saved immediately, for example, to EEPROM 42. This occurs during the initialization or start up procedure, for example, within approximately 500 m-seconds after power being applied to the control subsystem 10, and before the electric motor 6 is enabled. During shut down, the value stored in the first non-volatile memory is incremented (e.g., 0001 to 0002).

Should power be interrupted before shut down is complete, upon application of power the control subsystem 10 restarts. During initialization or start up the values in both non-volatile memory locations are the same because the shut down procedure was not completed. The controller 40 sets the flag brownout_error, and torque production is consequently delayed.

The above description of illustrated embodiments, including what is described in the Abstract, is not intended to be exhaustive or to limit the invention to the precise forms disclosed. Although specific embodiments of and examples are described herein for illustrative purposes, various equivalent modifications can be made without departing from the spirit and scope of the invention, as will be recognized by those skilled in the relevant art. The teachings provided herein of the invention can be applied to other electric motor driven systems, not necessarily the exemplary electric motor driven vehicle generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and/or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP-based communication links (e.g., packet links).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to commonly assigned U.S. application Ser. No. 10/658,124 filed Sep. 9, 2003, are incorporated herein by reference, in their entirety. Aspects of the present methods and systems can be modified, if necessary, to employ systems, circuits and concepts of the various patents, applications and publications to provide yet further embodiments of the invention.

These and other changes can be made to the present methods and systems in light of the above-detailed description. In general, in the following claims, the terms used should not be construed to limit the invention to the specific embodiments disclosed in the specification and the claims, but should be construed to include all electric motor driven systems, electric motor drive systems, and methods that operated in accordance with the claims. Accordingly, the invention is not limited by the disclosure, but instead its scope is to be determined entirely by the following claims.

We claim:

1. A method of operating an electric motor driven system comprising an electric motor and a control subsystem coupled to control the electric motor, the method comprising:
   determining if an interruption of power to the control subsystem controlling the electric motor has occurred during at least one ON/OFF cycle of the electric motor driven system before a shutdown procedure is completed;
   delaying torque production of the electric motor if it is determined that an interruption of power to the electric motorcontrol subsystem has occurred during the at least one ON/OFF cycle of the electric motor;
   storing in a first nonvolatile memory location a value indicative of a number of times the control subsystem has executed a shut down procedure; and
   storing in a second nonvolatile memory location a value indicative of a number of times that the control subsystem has started.

2. The method of claim 1 wherein storing in a first nonvolatile memory location a value indicative of a number of times the control subsystem has executed a shut down procedure comprises storing the value to a first location of a flash memory as part of the shut down procedure.

3. The method of claim 1 wherein storing in a second nonvolatile memory location a value indicative of a number of times that the control subsystem has started comprises storing the value to a first location of an electronically erasable programmable read-only memory as part of a startup procedure.

4. The method of claim 1 wherein storing in a first nonvolatile memory location a value indicative of a number of times the control subsystem has executed a shut down procedure comprises storing the value to a first location of an electronically erasable programmable read-only memory as part of the shut down procedure and wherein storing in a second nonvolatile memory location a value indicative of a number of times that the control subsystem has started comprises storing the value to a second location of the electronically erasable programmable read-only memory as part of a startup procedure.

5. The method of claim 1 wherein determining if an interruption of power to the control subsystem controlling the electric motor has occurred during at least one ON/OFF cycle of the electric motor driven system comprises comparing the value stored in the first nonvolatile memory location with the value stored in the second nonvolatile memory location.

6. The method of claim 5 wherein determining if an interruption of power to the control subsystem controlling the electric motor has occurred during at least one ON/OFF cycle of the electric motor driven system further comprises determining that an interruption has occurred if the value stored in the first nonvolatile memory location is equal to the value stored in the second nonvolatile memory location.

7. The method of claim 6, further comprising:
setting the value stored in the second nonvolatile memory location equal to the value stored in the first nonvolatile memory location after determining that an interruption has occurred if the value stored in the first nonvolatile memory location is equal to the value stored in the second nonvolatile memory location.

8. The method of claim 5 wherein comparing the value stored in the first nonvolatile memory location with the value stored in the second nonvolatile memory location comprises determining a difference between the values stored in the first and the second nonvolatile memory locations, and comparing the difference to a defined value.

9. The method of claim 1 wherein storing in a first nonvolatile memory location a value indicative of a number of times the control subsystem has executed a shut down procedure comprises incrementing a count of the number of times the shut down procedure has executed.

10. The method of claim 1 wherein delaying torque production of the electric motor comprises delaying provision of control signals to an inverter electrically coupled to supply power to the electric motor by approximately a few hundred milliseconds.

11. A method of operating an electric motor of a vehicle, the method comprising:
in response to a startup of a controller, comparing a value stored in a first nonvolatile memory location to a value stored in a second nonvolatile memory location, the value stored in the first nonvolatile location indicative of a number of times that the controller has executed a shut down procedure and the value in the second nonvolatile memory location indicative of a number of times that the controller has started up; and
delaying torque production of the electric motor if the value stored in the first nonvolatile memory location is equal to the value stored in the second nonvolatile memory location.

12. The method of claim 11 further comprising:
incrementing the value stored in the first nonvolatile memory location each time the shut down procedure is executed.

13. The method of claim 11 further comprising:
retrieving the value stored in the first nonvolatile memory location;
adding one to the retrieved value; and
storing the results of the addition to a location in a flash memory.

14. The method of claim 11 further comprising:
after comparing the value stored in the first nonvolatile memory location to the value stored in the second nonvolatile memory location, storing the value stored in the first nonvolatile memory location to the second nonvolatile memory location as part of startup procedure before enabling the electric motor.

15. The method of claim 14 wherein storing the value stored in the first nonvolatile memory location to the second nonvolatile memory location comprises storing the value in the first nonvolatile memory location to a location in an electronically erasable programmable read-only memory.

16. The method of claim 11 wherein delaying torque production of the electric motor comprises delaying provision of control signals to an inverter electrically coupled to supply power to the electric motor until flux has built in the electric motor sufficiently to avoid instability.

17. A control subsystem for controlling operation of an electric motor of an electric motor driven system, the control subsystem comprising:
means for determining if an interruption of power to the control subsystem controlling the electric motor has occurred during at least one ON/OFF cycle of the electric motor driven system;
means for delaying torque production of the electric motor if it is determined that an interruption of power to the control subsystem has occurred during the at least one ON/OFF cycle of the electric motor;
a first nonvolatile memory location to store a value indicative of a number of times the control subsystem has executed a shut down procedure; and
a second nonvolatile memory location to store a value indicative of a number of times that the control subsystem has started, wherein the means for determining if an interruption of power to the control subsystem controlling the electric motor has occurred during at least one ON/OFF cycle of the electric motor driven system comprises means for comparing the value stored in the first nonvolatile memory location to the value stored in the second nonvolatile memory location.

18. The control subsystem of claim 17 wherein the first nonvolatile memory location is a location in a flash memory.

19. The control subsystem of claim 18 wherein the second nonvolatile memory location is a location in an electronically erasable read-only memory.

20. The control subsystem of claim 17 wherein the first nonvolatile memory location is a location in an electronically erasable read-only memory.

21. The control subsystem of claim 17, further comprising:
incrementing means for maintaining a count of a number of times the control subsystem has executed a shut down procedure stored to a first nonvolatile memory location as part of the shut down procedure.

22. A control subsystem for controlling an operation of an electric motor of a motor driven system, the control subsystem comprising:
a first nonvolatile memory location to store a value indicative of a number of times a controller has executed a shut down procedure;
a second nonvolatile memory location to store a value indicative of a number of times the controller has started up in a ON/OFF cycle; and
a processor configured to increment the value indicative of the number of times the controller has executed the shut down procedure at each execution of the shut down procedure, and further configured to delay torque production if a defined relationship between the value stored in the first nonvolatile memory location and the value stored in the second nonvolatile memory location is satisfied.

23. The control subsystem of claim 22 wherein the processor is further configured to determine if a defined relationship between the value stored in the first nonvolatile memory location and the value stored in the second nonvolatile memory location is satisfied.

24. The control subsystem of claim 23 wherein the processor is further configured to store the value stored in the first nonvolatile memory location to the second nonvolatile memory location after determine if a defined relationship between the value stored in the first nonvolatile memory location and the value stored in the second nonvolatile memory location is satisfied and before enabling the electric motor.

25. The control subsystem of claim 22 wherein the defined relationship is equality and the defined relationship is satisfied if the value stored in the second nonvolatile memory location is equal to the value stored in the first nonvolatile memory location.

26. The control subsystem of claim 22 wherein the second nonvolatile memory location is a first location in an electronically erasable programmable read-only memory.

27. The control subsystem of claim 26 wherein the first nonvolatile memory location is a location in a flash memory.

28. The control subsystem of claim 26 wherein the first nonvolatile memory location is a second location in the electronically erasable programmable read-only memory.

29. A method of operating an electric motor driven system comprising an electric motor and a control subsystem coupled to control the electric motor, the method comprising:
- checking a value stored in a first nonvolatile memory location during a startup procedure, the value representing whether a shut down procedure has previously been completed;
- delaying torque production of the electric motor if the value stored in the first nonvolatile memory location is equal to a first value;
- storing a second value to a first nonvolatile memory location as part of a startup procedure;
- after storing the second value to the first nonvolatile memory location as part of the startup procedure, enabling the electric motor; and
- if a shut down procedure is completed, storing the first value in the first nonvolatile memory location at the end of the shut down procedure.

* * * * *